United States Patent
Fuse

(10) Patent No.: US 9,703,758 B2
(45) Date of Patent: Jul. 11, 2017

(54) INFORMATION PROCESSING APPARATUS FOR CONVERTING AN ORIGINAL DOCUMENT HAVING A FORMAT INTO A FILE HAVING A DIFFERENT FORMAT AND INFORMATION PROCESSING METHOD

(75) Inventor: Hiroshi Fuse, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 139 days.

(21) Appl. No.: 13/454,363

(22) Filed: Apr. 24, 2012

(65) Prior Publication Data

US 2012/0278706 A1 Nov. 1, 2012

(30) Foreign Application Priority Data

Apr. 27, 2011 (JP) .................. 2011-099713

(51) Int. Cl.
  *G06F 17/21* (2006.01)
  *G06F 17/22* (2006.01)

(52) U.S. Cl.
  CPC ............... *G06F 17/2205* (2013.01)

(58) Field of Classification Search
  CPC ...... G06F 17/24; G06F 17/2247; G06F 17/10; G06F 17/211; G06F 17/212; G06F 17/2288
  USPC .................................. 715/255, 239
  See application file for complete search history.

(56) References Cited

U.S. PATENT DOCUMENTS

| 5,528,742 | A | * | 6/1996 | Moore et al. | 715/205 |
| 5,781,915 | A | * | 7/1998 | Kohno et al. | 715/234 |
| 5,805,747 | A | * | 9/1998 | Bradford | 382/310 |
| 2005/0008387 | A1 | * | 1/2005 | Sato | 399/81 |
| 2005/0038881 | A1 | * | 2/2005 | Ben-Itzhak | 709/223 |
| 2005/0289460 | A1 | * | 12/2005 | Tomita et al. | 715/530 |
| 2008/0018920 | A1 | * | 1/2008 | Kawamoto | H04N 1/603 358/1.9 |
| 2008/0320379 | A1 | * | 12/2008 | Chen | 715/209 |
| 2009/0086239 | A1 | * | 4/2009 | Selvaraj | G06F 3/1211 358/1.13 |
| 2009/0327328 | A1 | * | 12/2009 | Woodall | G06F 17/218 |
| 2010/0318897 | A1 | * | 12/2010 | Wang | G06F 17/22 715/234 |
| 2011/0128247 | A1 | * | 6/2011 | Sensu | 345/173 |
| 2011/0157609 | A1 | * | 6/2011 | Brady | G06T 11/60 358/1.6 |
| 2012/0096342 | A1 | * | 4/2012 | Wang | G06F 17/30011 715/234 |
| 2013/0179774 | A1 | * | 7/2013 | Wang | G06F 17/22 715/234 |

FOREIGN PATENT DOCUMENTS

JP 2007-323237 A 12/2007
JP 2011-19197 A 1/2011

* cited by examiner

*Primary Examiner* — Scott Baderman
*Assistant Examiner* — Hassan Mrabi
(74) *Attorney, Agent, or Firm* — Canon U.S.A. Inc., IP Division

(57) ABSTRACT

A common file is generated by converting an original document into a format that can be uniformly handled by an application. When the common file is shifted to an editable state based on an instruction for the generated common file, the original document is stored in the common file. On the other hand, when the common file is not shifted to an editable state based on the instruction, the original document is not stored in the common file.

13 Claims, 7 Drawing Sheets

INFORMATION PROCESSING APPARATUS FOR CONVERTING AN ORIGINAL DOCUMENT HAVING A FORMAT INTO A FILE HAVING A DIFFERENT FORMAT AND INFORMATION PROCESSING METHOD

BACKGROUND OF THE INVENTION

Field of the Invention

The present disclosure relates to an information processing apparatus configured to convert an application file that has a unique file format into a common file with a format that can be uniformly handled by another application, an information processing method, and a program.

Description of the Related Art

Recently, operational efficiency in offices has been improved with use of dedicated applications for management and editing of electronic documents. A use case example of business performed using a dedicated application will be described below. First, a user deletes a page or changes the page order of an application file using a document management application and a document editing application. During the operation, the pre-edited application file (the original document) is separately stored, and the changes that were made can be confirmed by browsing the original document. This application file has a file format unique to each application.

However, if the user has to perform the operation for separately storing the original document every time before editing the application file, the user has to remember an association between the pre-edited original document and the edited application file, which may deteriorate work efficiency.

Therefore, to resolve such an issue, a technique has been discussed in which the pre-edited original document and the edited application file themselves are made to have an association. Japanese Patent Application Laid-Open No. 2007-323237 discusses a technique in which an application file is converted into a common file format and the file application file as a conversion source is stored in the common file so that the converted file and the original document is stored in a common file. Here, the common file is a file generated by converting application files having different formats into the one having an application file format that can be uniformly handled by a dedicated application.

Japanese Patent Application Laid-Open No. 2011-19197 discusses a technique for converting a plurality of application files having different formats into one common file. According to this technique, since the pre-edited original documents are stored in the common file in addition to the converted file, the need to store a file association is eliminated. Consequently, the original documents can be easily referred to.

When an application file is converted into a common file based on the technique discussed in Japanese Patent Application Laid-Open No. 2011-19197, a common file including the original document is always generated regardless of how the common file to be generated by the conversion is to be used. However, for example, when the common file is to be used for printing, the original document included in the common file is not used. More specifically, in the conventional art, there is the issue that a common file including the original document is generated that has a larger file size and takes longer to generate than a common file that does not include the original document, even when the original document will not be used and is not necessary.

SUMMARY OF THE INVENTION

The present disclosure is directed to an information processing apparatus that can, when converting an original document into a common file, reduce a processing time taken to generate the common file and reduce a file size of the generated common file when the original document is not necessary.

According to an aspect of the present disclosure, an information processing apparatus includes a generation unit configured to generate a common file by converting an original document as a processing target into a format that can be uniformly handled by an application, a receiving unit configured to receive an instruction for the generated common file, and a storage unit configured to store in the common file the original document that is a conversion source of the common file if the common file is shifted to an editable state based on the instruction received by the receiving unit, and not store in the common file the original document that is a conversion source of the common file if the common file is not shifted to an editable state based on the instruction.

According to an aspect of the present disclosure, when an application file is converted into a common file format, the processing time taken to generate the common file and the file size of the generated file can be reduced when an original document does not need to be stored.

Further features and aspects will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the disclosure and, together with the description, serve to explain the principles disclosed herein.

DESCRIPTION OF THE EMBODIMENTS

Various exemplary embodiments, features, and aspects will be described in detail below with reference to the drawings.

Figure 1:
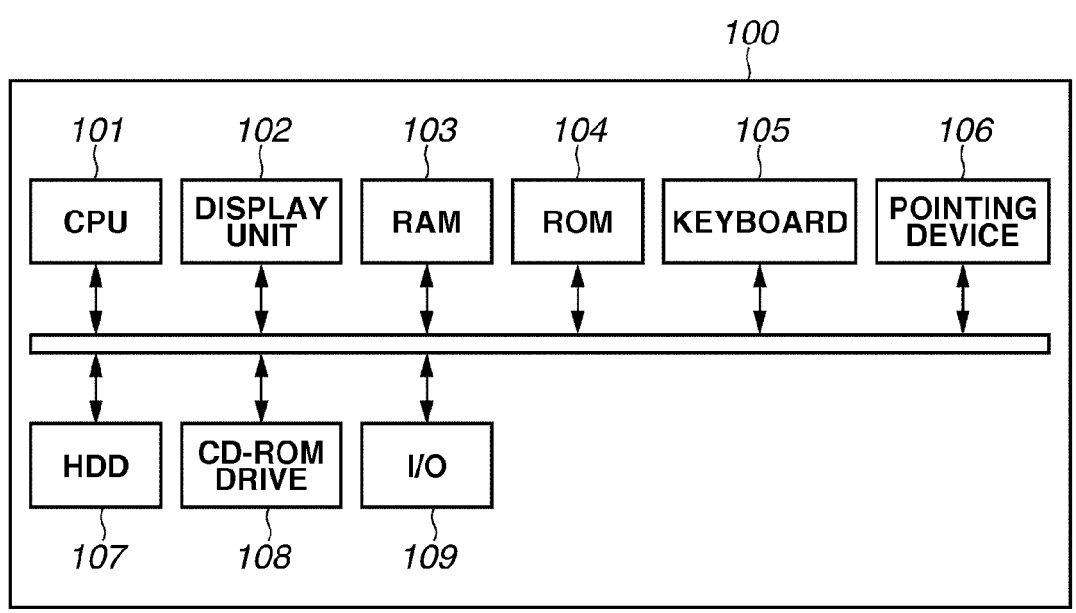
FIG. 1 illustrates a hardware configuration of an information processing apparatus.

FIG. 1 illustrates a hardware configuration of an information processing apparatus 100 that is applied in a first exemplary embodiment.

In FIG. 1, the information processing apparatus 100 is a computer used by a user. A predetermined operating system (OS) and various applications for executing specific function processing are installed in the information processing apparatus 100. Examples of such specific function processing include document processing, spreadsheet processing, presentation processing, image processing, and graphics processing. Each application has a different data structure (file structure) for each handled application file, and an identifier that is different for each application.

When a print instruction is issued for a predetermined file, the OS determines the identifier of a file to be printed (i.e., print target file), and issues the print instruction to the application that handles the determined identifier (that is associated with the identifier). Further, an integration application for integrating and managing the various functions on the desktop is also installed in the information processing apparatus 100.

The integration application includes a function of integrating and managing information, a function of reducing printing costs, a function of improving facsimile operations, a function of improving paper computerization operations, a function of performing an approval operation based on an electronic document, and a function of sharing information within a company. Further, the information processing apparatus 100 is provided with a keyboard 105 and a pointing device 106, which are input devices for receiving user operation inputs. In addition, the information processing apparatus 100 includes a display unit 102 which gives visual output information feedback to the user.

The information processing apparatus 100 also includes storage devices such as a random access memory (RAM) 103, a read-only memory (ROM) 104, and a hard disk drive (HDD) 107, which store the various programs and execution information used in the present exemplary embodiment. Further, the information processing apparatus 100 is provided with a compact disk (CD) ROM 108 for reading data recorded on a CD.

The OS and other control programs, including a control program for realizing the present invention, are loaded to the RAM 103 and executed by a central processing unit (CPU) 101. Further, the RAM 103 also functions as the various work areas and temporary storage area that are used to execute the control programs.

The ROM 104 stores the various control programs that execute various controls of the CPU 101. The information processing apparatus 100 also includes an interface device input/output (I/O) 109 for communicating with an external device and the CPU 101 for performing program execution. The connection mode with peripheral devices may be either wired or wireless.

Figure 2:
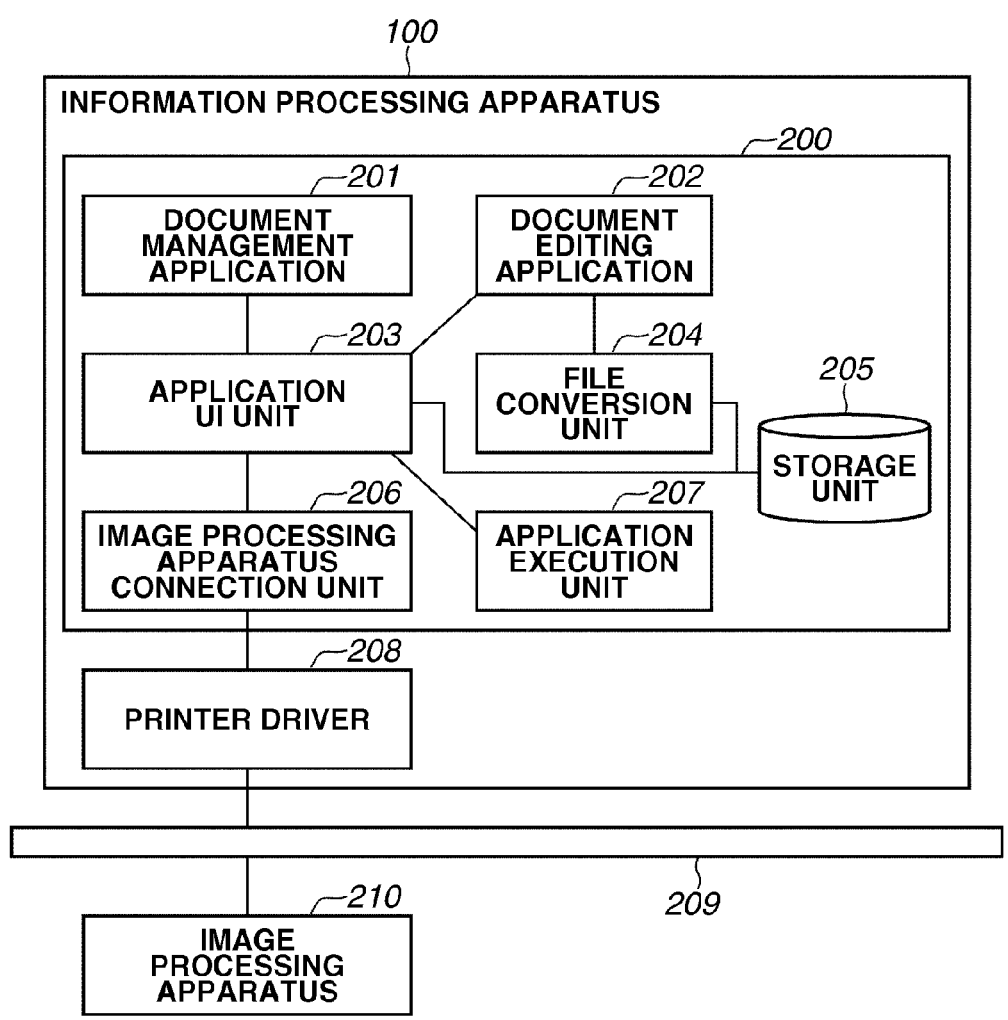
FIG. 2 illustrates a software configuration of an information processing apparatus.

FIG. 2 is a software configuration diagram illustrating a software configuration of the information processing apparatus 100. In FIG. 2, the information processing apparatus 100 transmits information to an image processing apparatus 210 based on an instruction from the user.

An integration application 200 includes various user interfaces for executing the various functions described above. The integration application 200 receives a request input from the user on a desktop of the information processing apparatus 100, and comprehensively manages execution of the various function processes. The integration application 200 is stored in the HDD 107, performs program execution with the CPU 101, and stores the execution information and temporary data in the RAM 103.

The integration application 200 includes components 201 to 207. In the integration application 200, a document management application 201 has a function of managing an electronic document. A document editing application 202 has a function of editing an electronic document and a print function in the integration application 200.

An application user interface (UI) unit 203 builds a user interface of the document management application 201 and the document editing application 202, and receives various input operations from the user.

A file conversion unit 204 converts an application file into a common file format based on the application file received by the application UI unit 203. The common file is a file generated by converting application files having different formats into a file having an application file format that can be uniformly handled by a dedicated application. Further, the file conversion unit 204 performs conversion processing of the application file in cooperation with the document editing application 202. Since conversion processing into a common file is the known technique, a detailed description thereof will be omitted in the present exemplary embodiment.

A storage unit 205 temporarily stores temporary data about the common file generated during file conversion by the file conversion unit 204 and the original document to be stored in the common file. Further, the storage unit 205 also stores a setting relating to a print preview (print preview setting) and information indicating the content of the print setting. The user interface used to set the print preview setting and the print setting will be described below with reference to FIGS. 3 and 4, respectively.

An image processing apparatus connection unit 206 connects to a printer driver to transmit information required for printing, such as the common file, the print preview setting, and the print setting, based on the various input operations received by the application UI unit 203.

An application execution unit 207 executes an operation corresponding to the input operation based on the various input operations received by the application UI unit 203. For example, the application execution unit 207 executes an operation corresponding to activation processing for the document editing application 202, a start instruction for print processing, or the like. A printer driver 208 acts as abridge for controlling the print processing operated by the application execution unit 207 in the image processing apparatus.

A local area network (LAN) 209 is a network for connecting the information processing apparatus 100 and the image processing apparatus 210. The information processing apparatus 100 and the image processing apparatus 210 can exchange information with each other via the LAN 209. In addition to a file transmission function, the image processing apparatus 210 includes a copy function, a scanner function, a printer function, a facsimile function, and the like.

Figure 3:
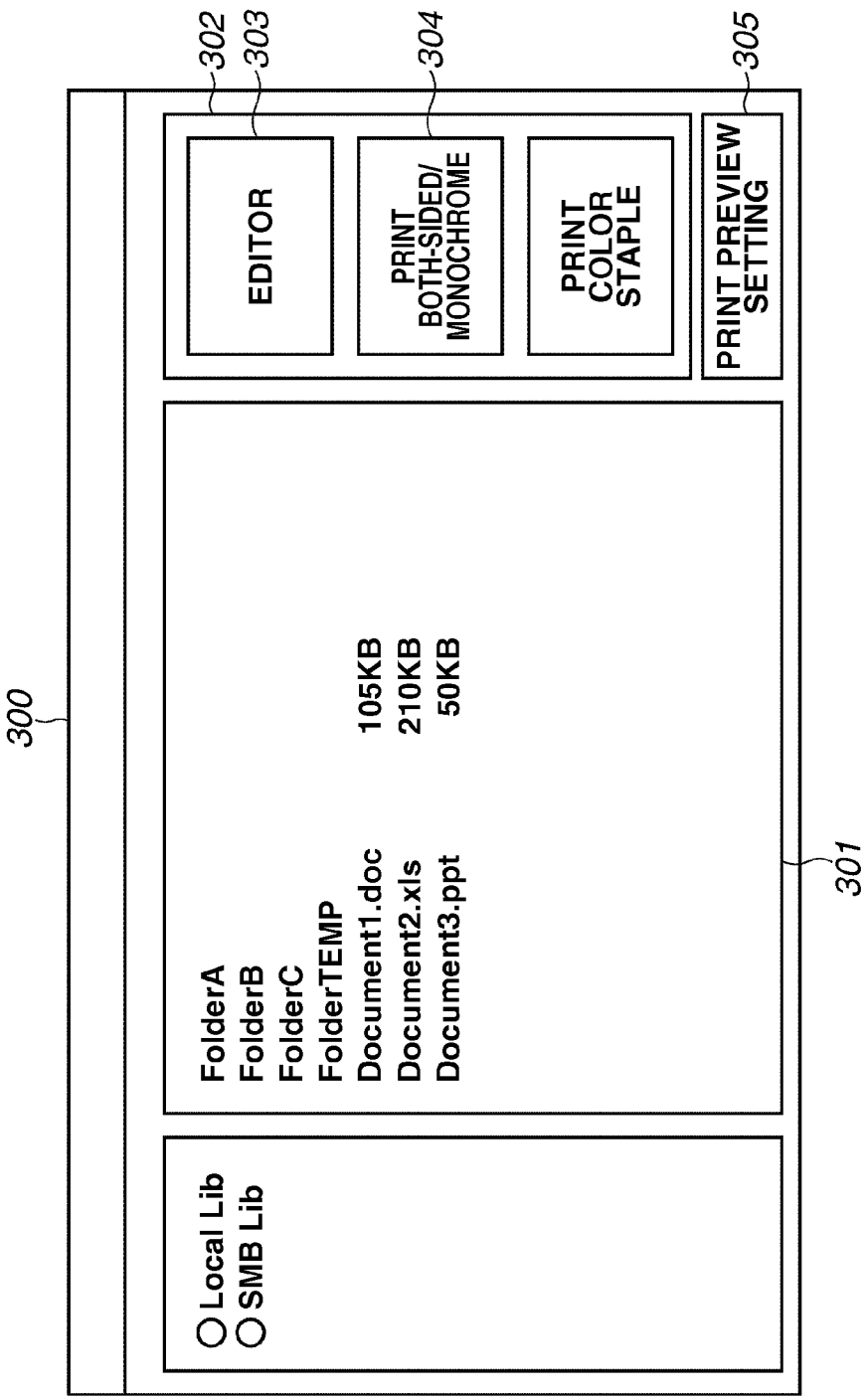
FIG. 3 illustrates an example of a user interface (UI) for editing a document.

FIG. 3 illustrates an example of a user interface of the document management application 201 which is displayed on a display unit 102 of the information processing apparatus 100. A main window 300, which shows a user interface of the document management application 201, includes a plurality of panes, such as a file list pane 301 and an icon list pane 302.

The file list pane 301 displays a list of files and folders managed by the document management application 201. The icon list pane 302 displays icons corresponding to applications that are linked with the document management application 201 or functions that can be executed by the integration application 200. Examples of the icons displayed in the icon list pane 302 include a document editing application icon 303 and a printer icon 304.

The document editing application icon 303 represents an icon corresponding to the function of editing an electronic document in the document editing application 202. In the file list pane 301, when the document editing application icon 303 is pressed in a state in which an editing target file (i.e., editing target file) is selected, the document editing application 202 is activated, and a screen for editing the editing target file is displayed. Further, the document editing application icon 303 also supports a drag and drop operation. Therefore, when an editing target file is dragged from among the files displayed by the file list pane 301 and dropped onto the document editing application icon 303, the screen for editing the editing target file is similarly displayed.

The printer icon 304 represents an icon corresponding to the function of printing an electronic document in the document editing application 202. The printer icon 304 is registered with respective print settings. In the file list pane 301, when the printer icon 304 is pressed in a state in which a print target file is selected, the print target file is printed based on the print setting registered with the printer icon 304 that was pressed. For example, if the printer icon 304 "printing: two-sided/monochrome" is pressed, the print target file is printed based on the setting two-sided printing, monochrome printing. The setting which can be registered with the icon is not limited to the above-described example. Various settings can be registered, such as a printer to be used for printing, an imposition setting such as N-up printing, a sheet size, a binding direction, punching, and stapling.

Further, the printer icon 304 also supports a drag and drop operation. When a print target file is dropped onto the printer icon 304, the print target file is printed based on the print setting registered with the printer icon 304 onto which the print target file was dropped. During this operation, a plurality of files may be simultaneously dragged and dropped, and the plurality of files may be handled as one single file.

The document editing application icon 303 and the printer icon 304 are icons for the document management application 201 to switch between two operations editing or printing and issue an instruction corresponding thereto.

A print preview setting button 305 is a button for setting whether to perform a print preview of an electronic document as the print target by the document editing application 202 when the electronic document is printed from the document management application 201. The setting concerning whether to perform a print preview of the common file can be stored for each printer icon 304. Further, the information set by the print preview setting button 305 is received by the application UI unit 203, and stored in the storage unit 205. When the print preview setting button 305 is pressed, the printer icon 304 displayed in the icon list pane 302 is displayed, so that whether to perform a print preview can be set for each printer icon 304.

The method for switching the print preview setting is not limited to the above-described example. For example, whether to perform a print preview can be switched by a method in which the property of the printer icon 304 is opened by a right-click operation and setting is switched by checking/unchecking on a checkbox. Further, various other setting methods may also be used to switch the print preview setting, such as switching by dragging and dropping the printer icon 304 onto the print preview setting button 305.

Figure 4:
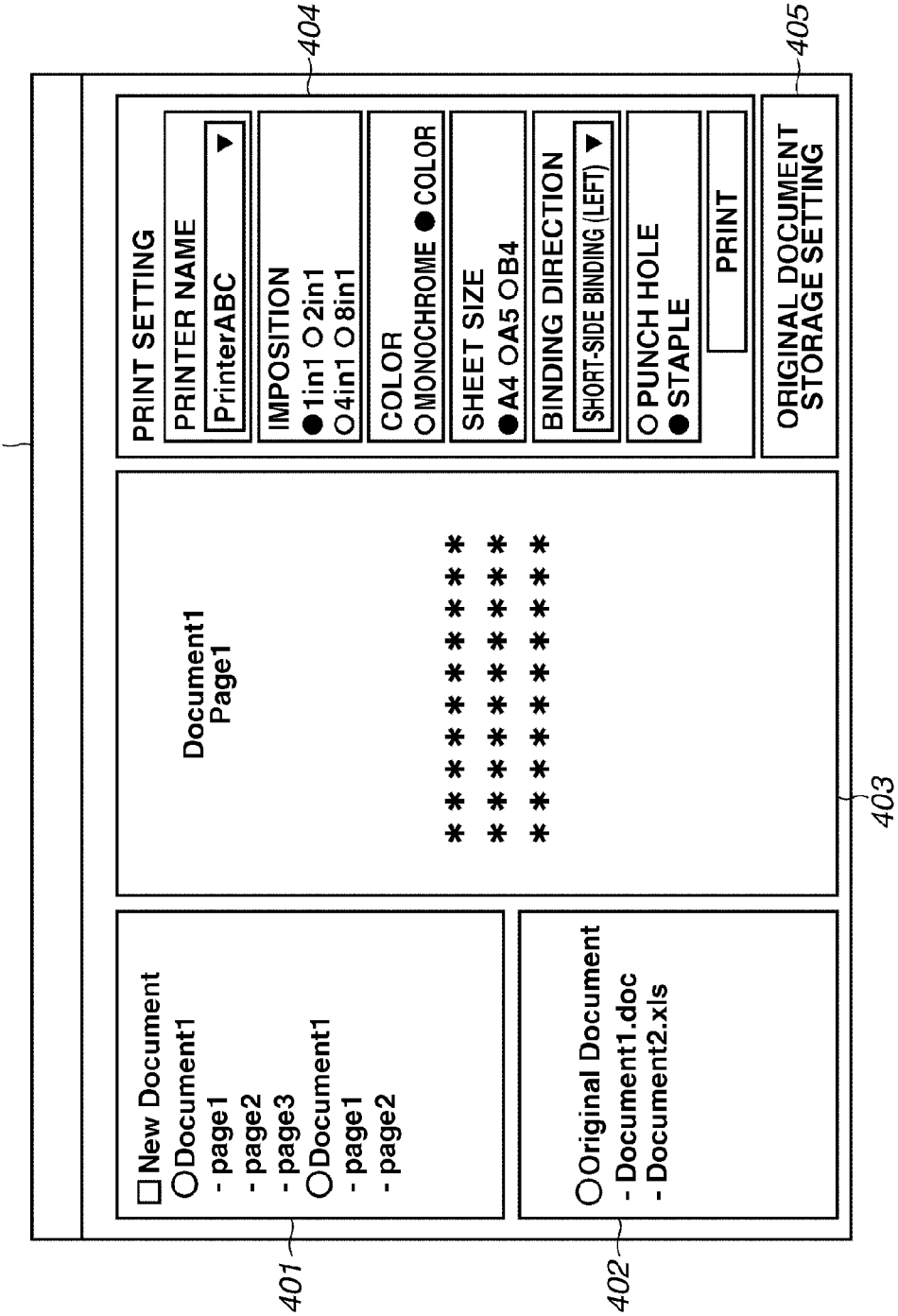
FIG. 4 illustrates an example of a UI for managing a document.

FIG. 4 illustrates an example of a user interface for the document editing application 202. The document management application 201 has a configuration that can issue an instruction to edit or print the managed file by switching between these two operations. A main window 400 shows a user interface for the document editing application 202.

A common file list pane 401 is a document list pane that displays a document structure of a common file. A document that has been dragged and dropped with the document editing application icon 303 is displayed in the common file list pane 401. For example, if two documents, namely Document1.doc and Document1.xls, are imported into the document editing application 202, the respective pages of the former file are displayed in the list pane. If the file includes a plurality of pages, pages corresponding to that number of pages are displayed. Further, the common file list pane 401 can also be used to rearrange the order of the pages or delete the pages of the document displayed in the common file list pane 401.

An original document display list pane 402 is a document list pane displaying the original document of the document that is displayed in the common file list pane 401. If a plurality of documents is imported into the document editing application 202, a plurality of original documents is displayed. Further, an application file can be exported and displayed from the original documents by selecting and performing an operation on a displayed original document.

A document editing window 403 shows the page that is selected in the common file list pane 401. A print setting screen 404 shows a screen for editing the print setting to be used when printing the document that is displayed in the common file list pane 401. The print setting screen 404 includes buttons for performing selection of the printer to be used for printing, an imposition setting, a color setting, a sheet size setting, a binding direction setting, a punch hole setting, a staple setting, and printing on the above document. The document editing application 202 stores these print settings in the storage unit 205 based on information received by the application UI unit 203. Although examples of the setting items on the print setting screen 404 are described above, the print settings that can be set are not limited to those setting items.

An original document storage setting button 405 can be used to set an original document storage setting. The document editing application 202 stores the original document storage setting in the storage unit 205 based on information received by the application UI unit 203. The user interface for setting the original document storage setting will be described below with reference to FIG. 6.

An outline of the editing operation performed by the document editing application 202 that has received an instruction to edit a file (editing instruction) from the document management application 201 will be described. The editing instruction mentioned here is not an instruction to actually edit the contents or the settings of the file, but rather is an instruction to shift the file to an editable state before editing.

The document editing application 202 converts the application file to be edited into the common file, and displays the main window 400, which can receive an editing operation from the user. In this case, the common file generated from the application file is edited, and the original contents may be lost. Therefore, in the editing operation, the document editing application 202 generates a common file that includes the original document of the application file.

Next, an outline of the printing operation performed by the document editing application 202 that has received an instruction to print a file (print instruction) from the document management application 201 will be described. The document editing application 202 converts the application file to be printed into the common file and instructs the printer driver 208 to print the generated common file based on the instructed print setting without displaying the main window 400. In this case, the common file generated from the application file is not edited, and there is no need for the common file to include the original document of the application file. Consequently, in the printing operation, the document editing application 202 generates a common file that does not include the original document of the application file.

The main window 400 can be used as a screen for displaying a print preview during printing. In this case, a print preview is displayed that matches the print settings set for the print target file. In other words, if an instruction to print a file is issued from the document management application 201, the main window 400, which can receive an editing operation, is displayed as a print preview. Consequently, when a print preview is displayed in the case where a print instruction is received, a common file that includes the original document of the application file is generated similar to when an editing instruction is received.

A specific method for switching between a print instruction and an editing instruction by the document management application 201 will be described. A print mode can be instructed by simultaneously specifying a printing option argument (e.g., /print) when the document management application 201 executes a command line of an execution file (e.g., EXE file) of the document editing application 202.

Further, an editing mode can be specified by simultaneously specifying an editing option argument (e.g., /edit) when the document management application 201 executes a command line of an execution file (e.g., EXE file) of the document editing application 202. If the similar switching instruction can be issued, the switching method is not limited to a means that is based on a command line argument. The document editing application 202 receives the above option argument, and switches and executes the printing and editing operations.

Figure 5:
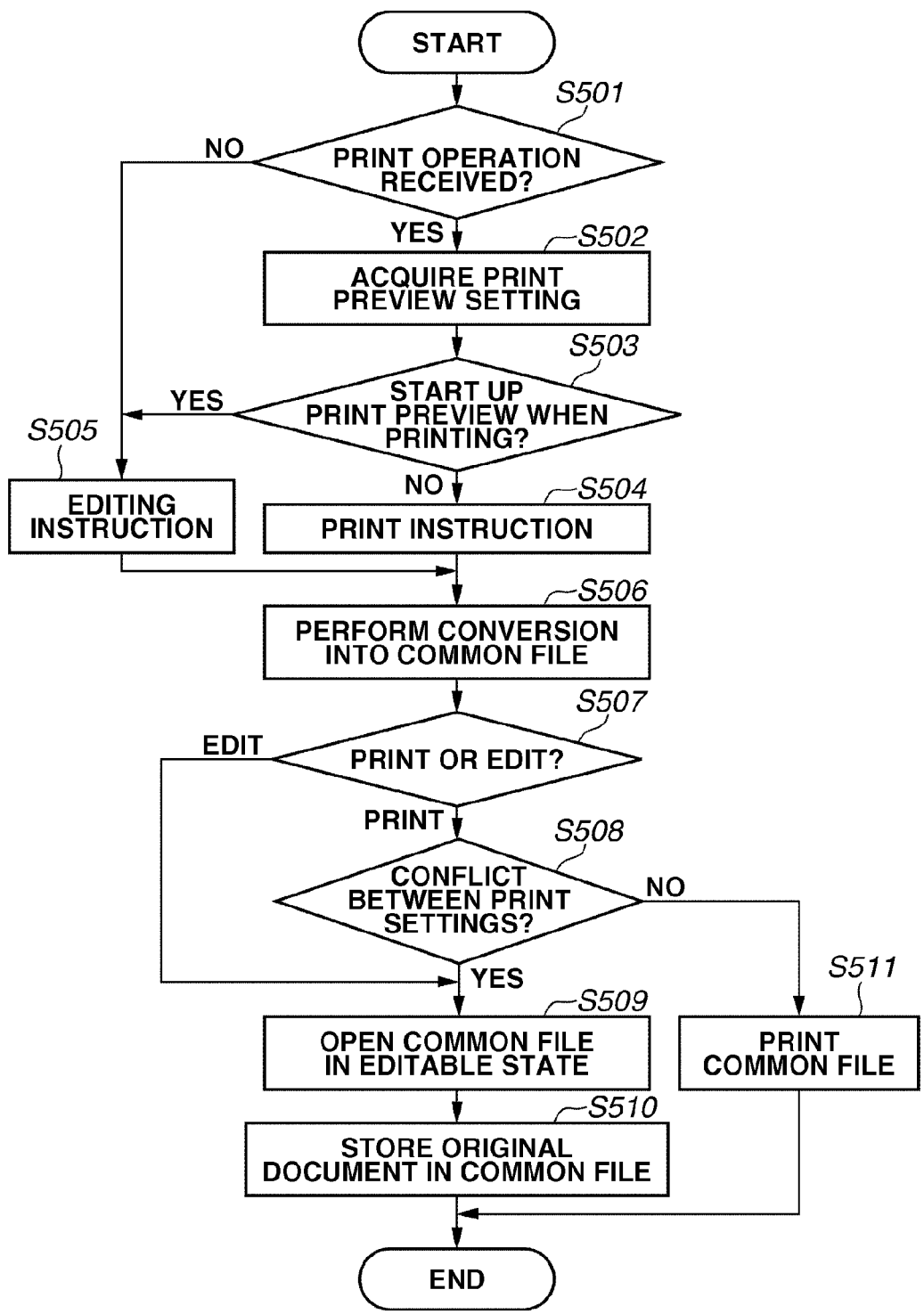
FIG. 5 is a flowchart illustrating a processing flow of common file generation according to a first exemplary embodiment.

FIG. 5 illustrates a flowchart of common file generation processing by the integration application 200 according to the present exemplary embodiment. The processing is started when the application UI unit 203 receives via the document editing application icon 303 or the printer icon 304 an operation indicating execution of the print function or of the editing function of an electronic document managed by the document management application 201.

Processing in steps S501 to S505 are executed by the document management application 201, and processing in step S506 and subsequent steps are executed by the document editing application 202. The processing performed in each of these steps will be described in detail below.

In step S501, the document management application 201 determines whether the operation received by the application UI unit 203 is an operation indicating execution of the print function or an operation indicating execution of the editing function.

If the printer icon 304 is pressed or a file is dropped onto the printer icon 304, the document management application 201 determines that the operation received by the application UI unit 203 is an operation indicating execution of the print function (YES in step S501).

On the other hand, if the document editing application icon 303 is pressed or a file is dropped onto the document editing application icon 303, the document management application 201 determines that the operation received by the application UI unit 203 is an operation indicating execution of the editing function (NO in step S501).

If it is determined that the operation received by the application UI unit 203 is the operation indicating execution of the print function (YES in step S501), the processing proceeds to step S502. On the other hand, if it is determined that the operation received by the application UI unit 203 is the operation indicating execution of the editing function (NO in step S501), the processing proceeds to step S505.

In step S502, the application execution unit 207 acquires the print preview setting of the document management application 201 from the storage unit 205. The print preview setting is a setting indicating whether the print preview is to be started by the document editing application 202 when a print instruction is issued from the document management application 201. The print preview setting is set via the print preview setting button 305. As described above, the print target file can be edited using the print preview started by the document editing application 202. Further, the image processing apparatus connection unit 206 acquires the print setting set by the printer icon 304.

In step S503, the document management application 201 determines whether the print preview is to be started by the document editing application 202 when a print instruction is issued based on the print preview setting acquired in step S502.

When a print instruction is issued, and it is determined that the print preview is not to be started by the document editing application 202 (NO in step S503), the processing proceeds to step S504. On the other hand, when a print instruction is issued, and it is determined that the print preview is to be started by the document editing application 202 (YES in step S503), the processing proceeds to step S505.

In step S504, the document management application 201 issues a print instruction to the document editing application 202. As described above, the print instruction is executed by the document management application 201 specifying a print mode argument for the document editing application 202.

In step S505, the document management application 201 issues an editing instruction to the document editing application 202. Since the editing processing is performed by the document editing application 202, the document management application 201 instructs the document editing application 202 to start the screen that enables a user to perform editing. As described above, the editing instruction is executed by the document management application 201 specifying an editing mode argument for the document editing application 202.

In step S506, the file conversion unit 204 generates a common file by converting the format of the electronic document to be processed that is received by the application UI unit 203 into a common file via the document editing application 202. In step S506, the common file generated by the file conversion unit 204 is saved as a temporary file, and stored in the storage unit 205 of the integration application 200.

In step S507, the document editing application 202 determines whether to print or edit the common file generated in step S506. In step S507, based on the determination in steps S504 and S505, if the instruction from the document management application 201 is a print instruction, it is determined to print the common file (PRINT in step S507), the processing proceeds to step S508. On the other hand, if the instruction from the document management application 201 is the editing instruction, it is determined to edit the common file (EDIT in step S507), the processing proceeds to step S509.

In step S508, the document editing application 202 determines whether there is a print setting conflict. The print setting conflict is a contradiction between the print setting specified by the application side and the print setting that can be executed by the image processing apparatus 210 side.

In the processing in step S508, the document editing application 202 acquires configuration information about the output destination image processing apparatus 210 via the printer driver 208. Based on the acquired configuration information, the document editing application 202 determines whether the plurality of settings included in the print setting corresponding to the printer icon 304 acquired in step S502 can be executed by the image processing apparatus 210.

Based on the determination, if there is even one setting that cannot be executed, a conflict is determined to exist. If it is determined that there is a conflict (YES in step S508), the processing proceeds to step S509. Whereas if it is determined that there is no conflict (NO in step S508), the processing proceeds to step S511.

In step S509, the document editing application 202 opens the common file generated in step S506, and displays the opened common file in the main window 400. A preview of the common file is displayed in the main window 400, and the main window 400 shifts a state to the one that can receive an editing operation from the user. If the processing up to this point is based on the print instruction from the document management application 201, the print setting screen 404 in the main window 400 is displayed in a state that reflects the print setting acquired in step S503.

In step S510, the document editing application 202 stores the original document of the file conversion source in the common file generated in step S506. After the processing in step S510, the processing performed in the flowchart in FIG. 5 is finished. Once the print preview is displayed, or the original document of the file conversion source is stored in the common file in step S510 due to the occurrence of the conflict, the common file is then printed based on a print operation from the user.

In step S511, the document editing application 202 issues a print request to the image processing apparatus 210 via the printer driver 208 to print the common file based on the print setting acquired in step S503. After the processing in step S511, the processing performed in the flowchart in FIG. 5 is finished.

According to the above-described processing flow, the original document is stored in the common file only when the common file is in an editable state by the document editing application 202 (state in which it can receive a user operation). Consequently, if the original document does not need to be stored in the common file, such as when printing is performed without shifting to an editable state, processing is not performed, so that a processing time and a file size can be reduced.

In the above-described exemplary embodiment, a case is described in which an original document is stored in a common file after the common file is opened in an editable state. In a second exemplary embodiment, an example will be described in which the timing for storing an original document in a common file and the content of the original document to be stored can be set in more detail.

Similar to the first exemplary embodiment, the present exemplary embodiment is also applied to the information processing apparatus 100. Therefore, the descriptions that are the same as the first exemplary embodiment will be omitted, and only parts that are different from the first exemplary embodiment will be described.

Figure 6:
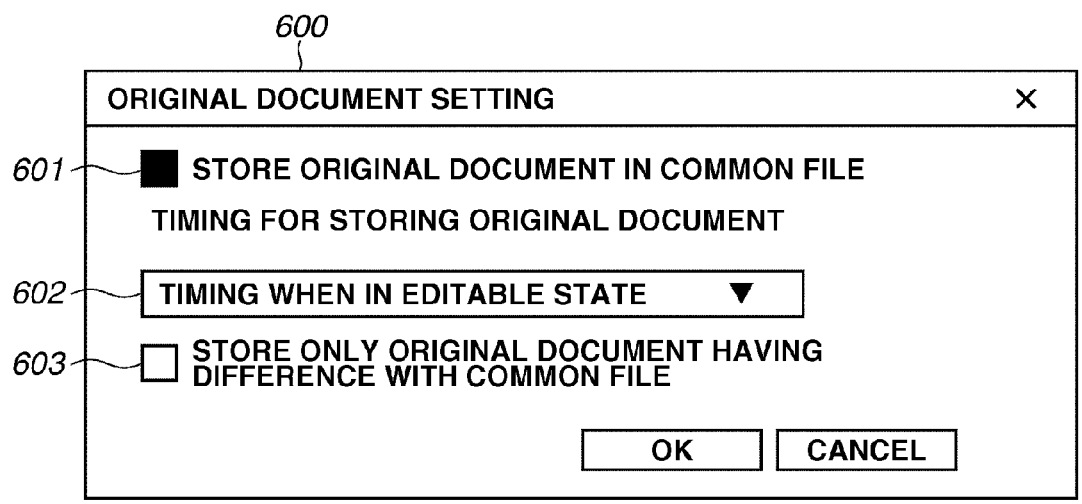
FIG. 6 illustrates an example of a UI for setting a storage condition of an original document.

FIG. 6 illustrates an example of a UI for setting an original document storage condition with the document editing application 202. An original document storage setting dialog 600 is displayed when the original document storage setting button 405 is pressed in the main window 400 of the document editing application 202.

A user can set the timing for storing the original document in the common file and the content of the original document to be stored in the common file via the original document storage setting dialog 600. The original document storage setting dialog 600 includes an original document storage checkbox 601, a storage timing dropdown list 602, and a difference document storage checkbox 603.

The original document storage checkbox 601 is a checkbox for setting whether to store an original document in the common file generated in step S506. When the original document storage checkbox 601 is checked ("ON"), the original document is stored in the common file. When the original document storage checkbox 601 is unchecked ("OFF"), the original document is not stored in the common file.

The storage timing dropdown list 602 is a dropdown list for selecting the timing for storing an original document in the common file. In the present exemplary embodiment, there are four choices displayed in the storage timing dropdown list 602 as the selectable timing for storing an original document in the common file. The four choices that can be selected are "when in editable state", "when editing operation is received", "when original document is referred to", and "when common file storage operation is received".

The timing "when in editable state" is the timing at which the document editing application 202 is activated, and the main window 400 is displayed with the common file opened in an editable state. This is the same timing as in the first exemplary embodiment. If "when in editable state" is selected, since the original document is stored in the common file at the point when the main window 400 is displayed, the original document is stored even if the common file is not actually edited.

The timing "when editing operation is received" is the timing at which the application UI unit 203 receives from the user an editing operation on the common file that is opened on the main window 400. If "when editing operation is received" is selected, the original document is not stored in the common file at the point when the main window 400 is displayed, and the original document is stored only when the common file is actually edited.

The timing "when original document is referred to" is the timing at which the application UI unit 203 receives an referring operation for displaying the original document corresponding to the common file 401 that is opened on the main window 400. If "when original document is referred to" is selected, the original document is not stored in the common file at the point when the main window 400 is displayed, and the original document is stored only when the original document corresponding to the common file is referred to.

The timing "when common file storage operation is received" is the timing at which the application UI unit 203 receives an operation for storing the common file that is opened on the main window 400. If "when common file storage operation is received" is selected, the original document is not stored in the common file at the point when the main window 400 is displayed, and the original document is stored only when the common file is stored.

Examples of the timings displayed in the storage timing dropdown list 602 as choices for storing the original document in the common file are not limited to the four choices described above, and may include some other timing.

The difference document storage checkbox 603 is a checkbox for setting whether to, if there is a difference between the common file and an original document, store the original document that has a difference with the common file in the common file. When the difference document storage checkbox 603 is checked ("ON"), only original documents that have a difference with the common file are stored in the common file. When the difference document storage checkbox 603 is unchecked ("OFF"), all original documents are stored regardless of whether they have a difference.

For example, a case will be described in which a common file is generated by converting two original documents (an original document A and an original document B), and in the common file, only a part corresponding to the original document B is edited and the contents are changed from the original document B.

In this case, if the difference document storage checkbox 603 is set to OFF, when the original documents are stored in the common file, both the original document A and the original document B are stored. On the other hand, if the difference document storage checkbox 603 is set to ON, when the original documents are stored in the common file, only the original document B that has a difference with the common file is stored. The original document A that does not have a difference with the common file is not stored.

Thus, by setting the difference document storage checkbox 603 to ON, among the original documents in the common file, since only the original document corresponding to a changed pert in the common file is stored, the processing time can be reduced and the file size can be decreased.

In the original document storage setting dialog 600, if the original document storage checkbox 601 is unchecked (the setting is OFF), original documents will not be stored in the common file. In such a case, the storage timing dropdown list 602 and the difference document storage checkbox 603 settings are unnecessary, and thus it is desirable that these settings are grayed out so that they cannot be edited.

Figure 7:
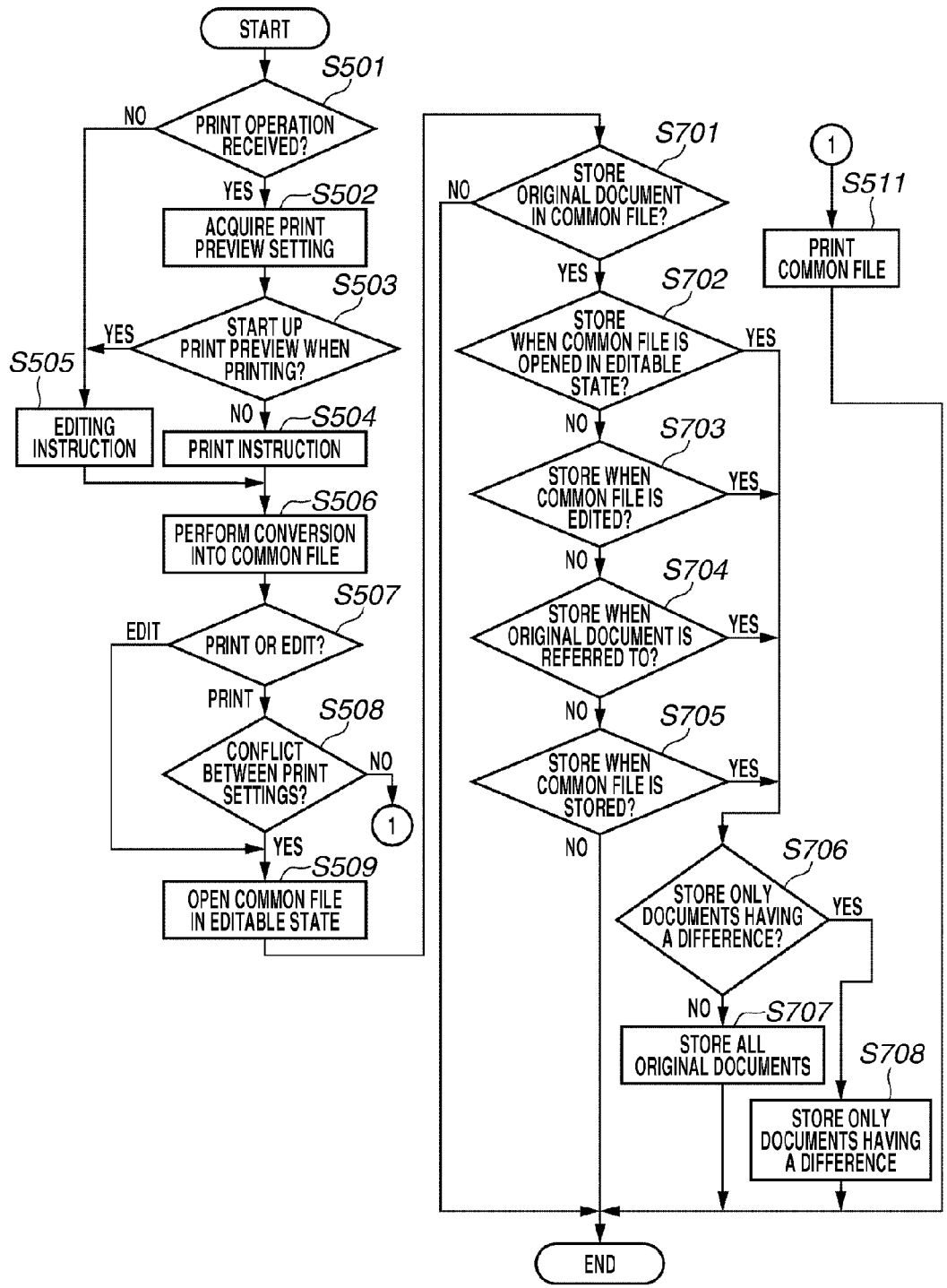
FIG. 7 is a flowchart illustrating a processing flow of common file generation according to a second exemplary embodiment.

FIG. 7 illustrates a flowchart of common file generation processing by the integration application 200 according to the present exemplary embodiment. The processing in the flowchart in FIG. 7 is started when the application UI unit 203 receives execution of the print function or of the editing function of an electronic document managed by the document management application 201. In FIG. 7, steps in which the same processing is performed as in the flowchart in FIG. 5 are denoted with the same reference numerals, and a description thereof is omitted here.

In step S701, the document editing application 202 determines whether the original document is set to be stored in the common file. If the original document storage checkbox 601 is checked (setting is ON), the document editing application 202 determines that the original document is set to be stored in the common file (YES in step S701), so the processing proceeds to step S702. On the other hand, if the original document storage checkbox 601 is unchecked (setting is OFF), the document editing application 202 determines that the original document is not set to be stored in the common file (NO in step S701), so the processing performed in the flowchart in FIG. 7 is finished.

In step S702, the document editing application 202 determines whether the timing for storing the original document in the common file is when the common file is opened in an editable state. If "when in editable state" is selected in the storage timing dropdown list 602, the processing proceeds to step S706 when the common file is opened in an editable state (YES in step S702). On the other hand, if "when in editable state" is not selected in the storage timing dropdown list 602, the processing proceeds to step S703.

In step S703, the document editing application 202 determines whether, if an editing operation for the common file is received from the user, the timing for storing the original document in the common file is when the common file is edited. If "when editing operation is received" is selected in the storage timing dropdown list 602, and the processing proceeds to step S706 when the common file is edited (YES in step S703). On the other hand, if "when editing operation is received" is not selected in the storage timing dropdown list 602, the processing proceeds to step S704.

In step S704, the document editing application 202 determines whether, if an operation for referring to the original document is received from the user, the timing for storing the original document in the common file is when the original document is referred to. If "when original document is referred to" is selected in the storage timing dropdown list 602, and the processing proceeds to step S706, when the original document is referred to (YES in step S704). On the other hand, if "when original document is referred to" is not selected in the storage timing dropdown list 602, the processing proceeds to step S705.

In step S705, the document editing application 202 determines whether, if an operation for storing the common file is received from the user, the timing for storing the original document in the common file is when the common file is stored. If "when common file storage operation is received" is selected in the storage timing dropdown list 602, the processing proceeds to step S706 when the common file is stored (YES in step S705). On the other hand, if "when common file storage operation is received" is not selected in the storage timing dropdown list 602, the processing performed in the flowchart in FIG. 7 is finished.

In step S706, the document editing application 202 determines whether the files to be stored in the common file are only original documents that have a difference with the common file. If the difference document storage checkbox 603 is checked (set to "ON"), it is determined that the files to be stored in the common file are only original documents having a difference with the common file (YES in step S706), and the processing proceeds to step S708. On the other hand, if the difference document storage checkbox 603 is unchecked (set to "OFF"), it is determined that the files to be stored in the common file are not only original documents having a difference with the common file (NO in step S706), and the processing proceeds to step S707.

In step S707, the document editing application 202 stores all original documents corresponding to the common file in the common file. After the processing in step S707, the processing performed in the flowchart in FIG. 7 is finished. Further, in step S707, if there is a plurality of original documents corresponding to the common file, all of the plurality of original documents are stored in the common file.

In step S708, among the original documents corresponding to the common file, the document editing application 202 stores the original documents having a difference with the common file in the common file, and does not store the original documents that do not have a difference with the common file in the common file. After the processing in step S708, the processing performed in the flowchart in FIG. 7 is finished.

Based on the processing according to the present exemplary embodiment, the timing for storing the original document in the common file and the content of the original document to be stored can be set in more detail, so that the original documents that match the user's wishes can be stored.

Aspects of the present invention can also be realized by a computer of a system or apparatus (or devices such as a CPU or an MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-099713 filed Apr. 27, 2011, which is hereby incorporated by reference herein in its entirety.

What is claimed is:

1. An information processing apparatus comprising:
   a setting unit configured to set whether to store an original document in a common file;
   a receiving unit configured to receive an instruction for an original document having a first format;
   a generation unit configured to generate a common file having a second format by converting the original document having the first format, wherein the common file having the second format can be handled by a predetermined application, and wherein the second format is different from the first format;
   a determination unit configured, when the generation unit generates the common file, to determine whether the instruction received by the receiving unit is an editing instruction or a printing instruction, wherein the editing instruction is an instruction for starting an editing screen that enables a user to perform editing the generated common file, and wherein the printing instruction is an instruction for printing the generated common file without starting the editing screen; and
   a storage unit configured to store the original document having the first format in the generated common file having the second format if the determination unit determines that the received instruction is the editing instruction and the setting unit sets that the original document is to be stored in the common file,
   wherein the storage unit does not store, even if the setting unit sets that the original document is to be stored in the common file, the original document having the first format in the generated common file having the second format if the determination unit determines that the received instruction is the printing instruction.

2. The information processing apparatus according to claim 1, wherein, the determination unit determines that the received instruction is the printing instruction if the receiving unit receives an instruction indicating printing of the common file without a print preview.

3. The information processing apparatus according to claim 1, wherein the determination unit determines that the received instruction is the editing instruction if the receiving unit receives an instruction indicating editing of the common file or an instruction indicating printing of the common file with a print preview.

4. The information processing apparatus according to claim 1, further comprising a selection unit configured to select a timing for storing the original document in the common file with the storage unit,
   wherein the storage unit stores the original document in the common file in accordance with the timing selected by the selection unit.

5. The information processing apparatus according to claim 4, wherein the timing that can be selected by the selection unit includes at least one of timings when the common file is shifted to an editable state, when the receiving unit receives an editing operation for the common file, when an original document corresponding to the common file is referred to, and when a storage operation of the common file is received.

6. The information processing apparatus according to claim 1, wherein the generation unit is configured to generate one common file having the second format by converting at least one original document having the first format, and the storage unit is configured to store only an original document having a difference with the common file in the common file.

7. A method for processing information, the method comprising:
   setting whether to store an original document in a common file;
   receiving an instruction for an original document having a first format;
   generating a common file having a second format by converting the original document having the first format, wherein the common file having the second format can be handled by a predetermined application, and wherein the second format is different from the first format;
   when the common file is generated in the generation step, determining whether the received instruction is an editing instruction or a printing instruction, wherein the editing instruction is an instruction for starting an editing screen that enables a user to perform editing the generated common file, and wherein the printing instruction is an instruction for printing the generated common file without starting the editing screen; and
   storing the original document having the first format in the generated common file having the second format if it is determined in the determining step that the received instruction is the editing instruction and it is set in the setting step that the original document is to be stored in the common file,
   wherein, even if it is set in the setting step that the original document is to be stored in the common file, the original document having the first format is not stored in the generated common file having the second format if it is determined in the determining step that the received instruction is the printing instruction.

8. The method according to claim 7, wherein it is determined in the determining step that the received instruction is the printing instruction if an instruction indicating printing of the common file without a print preview is received in the receiving step.

9. The method according to claim 7, wherein it is determined in the determining step that the received instruction is the editing instruction if an instruction indicating editing of the common file is received in the receiving step, or if an instruction indicating printing of the common file with a print preview is received in the receiving step.

10. The method according to claim 7, further comprising:
    selecting a timing for storing the original document in the common file in the storing; and storing the original document in the common file in accordance with the selected timing.

11. The method according to claim 10, wherein the timing that can be selected includes at least one of timings when the common file is shifted to an editable state, when an editing operation for the common file is received, when an original document corresponding to the common file is referred to, and when a storage operation of the common file is received.

12. The method according to claim 7, further comprising:
generating one common file having the second format by converting at least one original document having the first format; and
storing only an original document having a difference with the common file in the common file.

13. A non-transitory computer-readable storage medium which stores a program, the program causing a computer to function as:
setting whether to store an original document in a common file;
receiving an instruction for an original document having a first format;
generating a common file having a second format by converting the original document having the first format, wherein the common file having the second format can be handled by a predetermined application, and wherein the second format is different from the first format;
when the common file is generated in the generation step, determining whether the received instruction is an editing instruction or a printing instruction, wherein the editing instruction is an instruction for starting an editing screen that enables a user to perform editing the generated common file, and wherein the printing instruction, is an instruction for printing the generated common file without starting the editing screen; and
storing the original document having the first format in the generated common file having the second format if it is determined in the determining step that the received instruction is the editing instruction and it is set in the setting step that the original document is to be stored in the common file,
wherein, even if it is set in the setting step that the original document is to be stored in the common file, the original document having the first format is not stored in the generated common file having the second format if it is determined in the determining step that the received instruction is the printing instruction.

* * * * *